June 30, 1953  W. TRAVIS  2,644,029
NATURAL SILK INSULATED ELECTRIC CONDUCTOR
Filed July 27, 1949
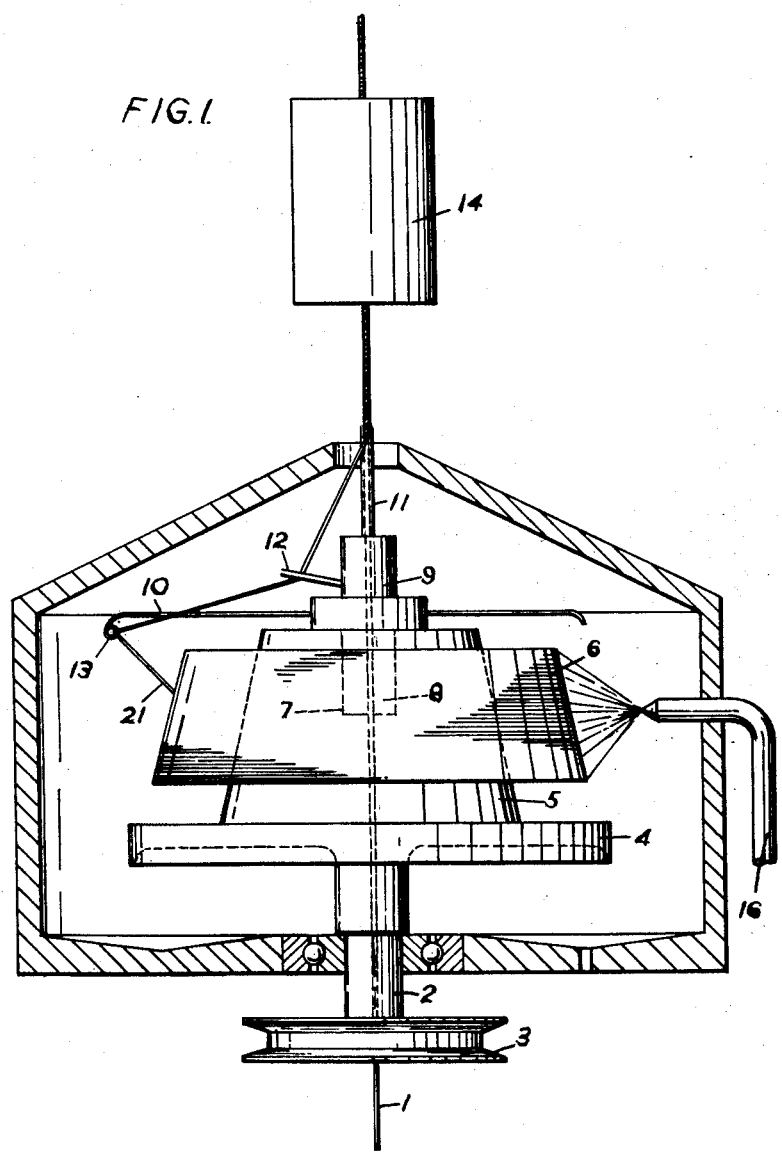
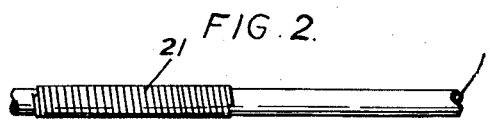
Inventor
William Travis
By Hoopes Leonard & Glenn
Attorneys Patented June 30, 1953

2,644,029

UNITED STATES PATENT OFFICE 2,644,029

NATURAL SILK INSULATED ELECTRIC CONDUCTOR

William Travis, Southport, England, assignor to Connollys (Blackley) Limited, Manchester, England, a British company Application July 27, 1949, Serial No. 107,115
In Great Britain August 16, 1948

8 Claims. (Cl. 174—124)

This invention relates to insulated electric conductors in which the insulating covering comprises one or more layers of natural silk.

Raw silk contains approximately 25% of the natural gum sericin. Natural silk normally used for insulating electric conductors is raw silk which has been treated by a process known as degumming or boiling off by which substantially all of the sericin is removed. This process and the associated operations of rewinding and throwing the treated silk increase its cost considerably.

The object of the present invention is to provide an improved silk covered wire which is economically and simply manufactured.

In accordance with the invention the covering comprises one or more layers of natural silk in which the major proportion of the naturally occurring sericin gum is retained. Sericin ring is an insulant, is chemically neutral and is not readily soluble, almost the only effective solvents being hot water and hot aqueous solutions. The silk is applied by lapping directly onto the conductor or over a layer of another insulating material e. g. enamel. Further layers of insulation may be applied over the silk layer or layers. The term "conductor" as used herein includes single conductors such as a wire or strip and multiple conductors made up from a number of wires stranded or bunched together.

Before application to the conductor the sericin gum in the silk is softened by a process which includes immersion in hot water. To maintain this soft condition until and during the lapping operation, the silk is kept wet. Since sericin gum is soluble in hot water a small proportion of the naturally occurring gum may be removed during the softening process but in all cases the major proportion of the gum is retained.

The natural silk containing the gum is obtained in the form of hanks or skeins; it is preferred to wind the silk thread from the hanks or skeins in the form of cheeses or onto spools before softening the gum by treating the cheeses or spools with water. While the silk is wet and the sericin soft the filaments of silk spread evenly on to the conductor to which they are applied.

The thorough softening of the gum by immersion of the silk in hot water is facilitated by a preliminary impregnation with water. A quantity of the silk wound on a suitable support, for example in the form of a cheese or on a spool, is enclosed in an evacuated chamber so as to remove as far as possible the air entrapped in its interstices. Sufficient water is then allowed to enter the chamber to immerse the silk. This preliminary treatment ensures that water reaches all the fibres of the silk throughout the whole of the cheese or spool. Altogether in this impregnation process and the subsequent hot water treatment the silk absorbs at least 100% by weight of water.

The preferred process of preparing the silk and applying it to a wire is hereinafter described as an example, with reference to the accompanying drawings in which Figure 1 is an elevation of a short length of the insulated conductor and Figure 2 is an elevation, partly in cross-section of a lapping head. The natural silk, obtained in the form of hanks or skeins, is wound onto cheeses or spools, appropriate precautions being taken to allow for the expansion of the silk during the softening process. If the silk is wound in the form of a cheese, that is on a plain tube, no special precautions are necessary but if ordinary spools are used it is necessary to wind the silk with sufficient interstices to accommodate the absorbed water. Alternatively, it is possible to use spools having flanges which are movable axially to allow for expansion of the silk.

The cheeses or spools are enclosed in a chamber which is first evacuated and then filled with sufficient water to immerse them. From this chamber they are transferred while still wet to a vessel containing water at a temperature of 90°–100° C. in which they remain until the gum is thoroughly softened. The softening normally takes about two hours but if lower temperatures are used, say 70° C., although satisfactory softening is possible, the time taken is considerably increased. This completes the softening process in which the silk absorbs at least 100% of its weight of water. Until required the silk is kept under cold water to keep the gum soft. It is found that the gum will remain soft for long periods without deterioration.

The silk is lapped onto the wire in a machine of the kind in which the wire passes axially through the cheese or spool and the cheese or spool is positively rotated about the wire, the silk being unwound by a flier which is free to rotate about the axis of the wire, subject to the exertion of a small frictional force between the flier and the spool, or a support for the spool. The flier extends across one end of the spool and projects radially outwards beyond the edge of the spool, carrying on its outer end an eye or guide through which the silk passes in its passage from the spool onto the wire. The pull exerted by the silk on the flier as it is wound on the wire causes the flier to rotate relative to the spool and unwrap the silk from the spool. The rate of relative movement is small compared with the rate of rotation of the head.

It will be seen that the tension to be exerted by the silk is comparatively small. It depends on friction, windage and inertia of the flier. These may be controlled by the design and selection of the materials so that the tension becomes of very small value. It is preferable to make the unavoidable forces small and to apply extra and adjustable tension by increasing the force of friction between the flier and the spool. This additional force may be applied by a spring arm pressing axially on the flier but not rotating with it and having its spring force adjustable.

The flier may be attached to and rotate with a device for guiding the silk onto the conductor. This may include a die and a spreader i. e. a flat bar with a narrow edge over which the silk is spread in the form of a ribbon. The lapping head is mounted in an enclosure and during the lapping operation the silk is kept wet by an atomised water spray arranged inside the enclosure. By means of this spray the humidity inside the enclosure is maintained at 100%.

Referring to Figure 1 of the drawings which shows the lapping head of a machine of the kind preferred, the wire 1 passes from a supply spool vertically upwards through a hollow spindle 2 rotated in known manner by a pulley 3 and carrying on its upper end a plate 4. On the plate 4 is fixed a support 5 for the silk cop 6. The support 5 is formed with a cylindrical recess 7 in which fits a downward extension 8 of a hub 9 which carries a flier 10. A die 11 and spreader bar 12 are also carried on the hub 9. The silk thread 21 passes from the cop 6, through an eye 13 on the end of the flier 10, over the spreader bar 12 and is guided onto the wire 1 by the die 11.

The covered wire passes upwards through a drying oven 14 onto a take-up spool of normal construction. The head is surrounded by a fixed enclosure 15 through one wall of which passes a water supply pipe 16 from which an atomised spray of water is directed onto the cop 6.

Figure 2 shows a length of the covered conductor consisting of a copper wire 1 covered with a single lapping of silk 2 from which the naturally occurring sericin gum has not been removed.

Although it has been found that this form of lapping machine is particularly suitable for use in the process of the present invention, especially when lapping very fine silk thread onto conductors, it is also possible to use the standard form of machine normally used for lapping silk onto conductors. In the standard machine the cop or spool is mounted on a rotating head which also carries the die and guides for directing the silk thread onto the conductor. The cop or spool is caused to rotate relatively to the head to unwind the silk by the tension of the silk. This tension may be comparatively large.

After the wet silk has been lapped onto the conductor it is thoroughly dried before use. The silk-covered conductor may be passed through a hot zone before being wound onto the take-up spool or hot air may be blown onto it as it is wound on the take-up spool. Alternatively, the spool can be removed from the machine when full and vacuum dried.

The insulated conductors of the present invention have the advantages that they are cheaper than known forms of silk insulated conductors in view of the use of less expensive silk and can be manufactured at higher speed. This latter advantage is obtained because the silk containing sericin can be lapped on with a longer lay than is usual with degummed silk. The degummed silk must be applied to the wire with a lay such that the silk does not readily unwind itself from the conductor or "run back" when the conductor is cut. However long the lay of the silk containing gum this will not occur since there is a slight adherence between the silk and the conductor, which is sufficient to prevent the silk running back when the conductor is cut.

What I claim as my invention is:

1. The method of manufacture of an insulated electric conductor which comprises immersing a quantity of silk, in which at least the major proportion of the naturally occurring sericin gum is retained, in hot water, thereby softening the gum, and lapping said silk, while still wet, helically round a conductor.

2. The method of manufacture of an insulated electric conductor which comprises immersing a quantity of silk, in which at least the major proportion of the naturally occurring sericin gum is retained, in hot water, thereby softening the gum, and lapping said silk helically round a conductor, while acted upon by an atomised water spray.

3. The method of manufacture of an insulated conductor which comprises enclosing a quantity of natural silk, in which the major proportion of the sericin gum is retained, in a chamber, evacuating said chamber, covering said silk with water, treating said silk with hot water whereby said gum is softened and lapping said silk while still wet helically round a conductor.

4. An electric conductor provided directly on the surface thereof with an insulating covering consisting of a helically lapped layer of natural silk threads in which the major proportion of the naturally occurring sericin gum is retained, said sericin gum bonding said threads together.

5. An electric conductor provided with at least one layer of a solid insulating material and, directly on the surface of the outermost of said layers, a further insulating covering consisting of a helically lapped layer of natural silk threads in which the major proportion of the naturally occurring sericin gum is retained, said sericin gum bonding said threads together.

6. An insulated electric conductor consisting of a single wire provided directly on the surface thereof with at least one helically lapped layer of natural silk threads in which the major proportion of the naturally occurring sericin gum is retained, said sericin gum bonding said threads together.

7. An insulated conductor consisting of an enamelled wire and, directly on the surface of the enamel, at least one helically lapped layer of natural silk threads in which the major proportion of the naturally occurring sericin gum is retained, said sericin gum bonding said threads together.

8. The method of manufacture of an insulated electric conductor which comprises softening the sericin gum in raw silk threads in which the major proportion of the naturally occurring sericin gum is retained and lapping said threads in a wet state helically round a conductor.

WILLIAM TRAVIS.

(References on following page)

References Cited in the file of this patent

UNITED STATES PATENTS

| Number | Name | Date |
|---|---|---|
| 171,185 | Splitdorf | Dec. 14, 1875 |
| 473,713 | Rueter | Apr. 26, 1892 |
| 2,012,610 | Lenher | Aug. 27, 1935 |
| 2,070,714 | Dreyfus | Feb. 16, 1937 |
| 2,109,087 | Goodings | Feb. 22, 1938 |
| 2,436,421 | Cork | Feb. 24, 1948 |

FOREIGN PATENTS

| Number | Country | Date |
|---|---|---|
| 3,685 of 1895 | Great Britain | Dec. 28, 1895 |

OTHER REFERENCES

Bleaching, Dyeing and Chemical Technology of Textile Fibres, 2d edition, 1946, by S. R. Trotman. Page 146, lines 3 and 4.